United States Patent
Townson et al.

(10) Patent No.: US 9,120,443 B2
(45) Date of Patent: Sep. 1, 2015

(54) REVERSE-DRIVE ELASTOMERIC HELICAL-THREAD HOOD BUMPER

(71) Applicants: James M. Townson, Clarkson, MI (US); Derek L. Patterson, Shelby Township, MI (US); Mark L. Felzien, Rochester Hills, MI (US); Duane T. Vanpamel, Washington, MI (US); Christopher C. Cook, Macomb, MI (US)

(72) Inventors: James M. Townson, Clarkson, MI (US); Derek L. Patterson, Shelby Township, MI (US); Mark L. Felzien, Rochester Hills, MI (US); Duane T. Vanpamel, Washington, MI (US); Christopher C. Cook, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/020,235

(22) Filed: Sep. 6, 2013

(65) Prior Publication Data

US 2014/0070570 A1 Mar. 13, 2014

Related U.S. Application Data

(60) Provisional application No. 61/698,582, filed on Sep. 8, 2012.

(51) Int. Cl.
| | |
|---|---|
| *B60R 19/18* | (2006.01) |
| *E05F 5/06* | (2006.01) |
| *B60R 19/02* | (2006.01) |
| *E05F 5/02* | (2006.01) |
| *B62D 25/12* | (2006.01) |

(52) U.S. Cl.
CPC ............... *B60R 19/18* (2013.01); *B60R 19/023* (2013.01); *E05F 5/022* (2013.01); *B62D 25/12* (2013.01)

(58) Field of Classification Search
CPC ...... B60R 19/02; B60R 19/023; B60R 19/03; B60R 19/18; B60R 19/30; B62D 25/105; B62D 25/12; E05F 5/022; E05Y 2900/536
USPC ............ 296/76, 181.11, 193.09, 193.11, 207; 16/82, 85; 180/69.2, 69.23
See application file for complete search history.

(56) References Cited

U.S. PATENT DOCUMENTS

| | | | |
|---|---|---|---|
| 3,274,638 A * | 9/1966 | Bien | .............................. 16/86 A |
| 4,012,807 A | 3/1977 | Kern | |
| 4,653,968 A | 3/1987 | Rapata et al. | |
| 5,765,882 A | 6/1998 | Trauscht et al. | |
| 6,088,878 A | 7/2000 | Antonucci et al. | |
| 6,119,306 A | 9/2000 | Antonucci et al. | |
| 7,469,445 B2 * | 12/2008 | Dennis et al. | .................. 16/86 R |
| 7,618,088 B2 | 11/2009 | Bauer | |
| 7,690,722 B2 * | 4/2010 | Boggess | ........................ 296/207 |
| 7,780,208 B2 | 8/2010 | Koppenhoehl et al. | |
| 8,387,211 B2 | 3/2013 | Kutschat | |

* cited by examiner

*Primary Examiner* — Jason S Daniels
(74) *Attorney, Agent, or Firm* — Cantor Colburn LLP

(57) ABSTRACT

A hood bumper is provided and includes a first end including a body defining a longitudinal axis and a surface having an angular edge oriented along the longitudinal axis, a second end opposite the first end and including a skirt portion and a bumper portion protruding from a longitudinal end of the skirt portion in a protrusion direction defined along the longitudinal axis and an intermediate section interposed between the first and second ends. The intermediate section includes reverse-drive helical threading.

17 Claims, 5 Drawing Sheets

REVERSE-DRIVE ELASTOMERIC HELICAL-THREAD HOOD BUMPER

CROSS-REFERENCES TO RELATED APPLICATIONS

This patent application claims priority to U.S. Provisional Patent Application Ser. No. 61/698,582 filed Sep. 8, 2012, which is incorporated herein by reference in its entirety.

FIELD OF THE INVENTION

The subject invention relates to adjustable hood bumpers, and more particularly, to a reverse-drive, elastomeric helical-thread hood bumper.

BACKGROUND

Front hood bumpers are disposed in a front end of a vehicle and have upper portions or surfaces that contact a front hood when the front hood is closed. The front hood bumpers are used to controllably adjust hood travel limits during closure of a front hood of a vehicle. The hood bumpers can also be used to control the upward force applied to the hood during closure events to prevent undesirable noise and vibration.

Normally, the front hood bumpers are fastened to the front end of the vehicle by being screwed into placed in the top-down direction. This means that the front hood bumpers need to have an upper end that is tool engageable. However, configuring the front hood bumpers to be tool engageable leads to the front hood bumpers being configured more for utility and less for appearance, which can be undesirable considering the visibility of the front hood bumpers when the hood is opened.

SUMMARY OF THE INVENTION

In one exemplary embodiment of the invention, a hood bumper is provided and includes a first end including a body defining a longitudinal axis and a surface having an angular edge oriented along the longitudinal axis, a second end opposite the first end and including a skirt portion and a bumper portion protruding from a longitudinal end of the skirt portion in a protrusion direction defined along the longitudinal axis and an intermediate section interposed between the first and second ends. The intermediate section includes reverse-drive helical threading.

In another exemplary embodiment of the invention, a hood bumper assembly is provided and includes a bracket element including a surface defining a bore and a helically tapered ramp at the bore and a hood bumper comprising a tool engageable first end, a non-tool engageable second end and reverse-drive helical threading disposed along a longitudinal axis between the tool engageable first end and the non-tool engageable second end. The hood bumper is disposable in the bore with the tool engageable first end at an underside of the surface and such that the threading engages with the ramp to locate the non-tool engageable second end at a corresponding height at a topside of the surface.

In yet another exemplary embodiment of the invention, a method of assembling a hood portion of a vehicle is provided and includes disposing a plurality of bracket elements about a front region of a vehicle, each bracket element comprising a surface defining a bore and a helically tapered ramp at the bore, installing a hood bumper into each of the plurality of bracket elements, each hood bumper comprising a tool engageable first end, a non-tool engageable second end and reverse-drive helical threading disposed along a longitudinal axis defined between the tool engageable first end and the non-tool engageable second end and engaging the reverse-drive helical threading with the ramp at each one of the plurality of bracket elements by rotating each of the hood bumpers to thereby locate the respective non-tool engageable second ends at corresponding heights relative to a topside of the surface.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
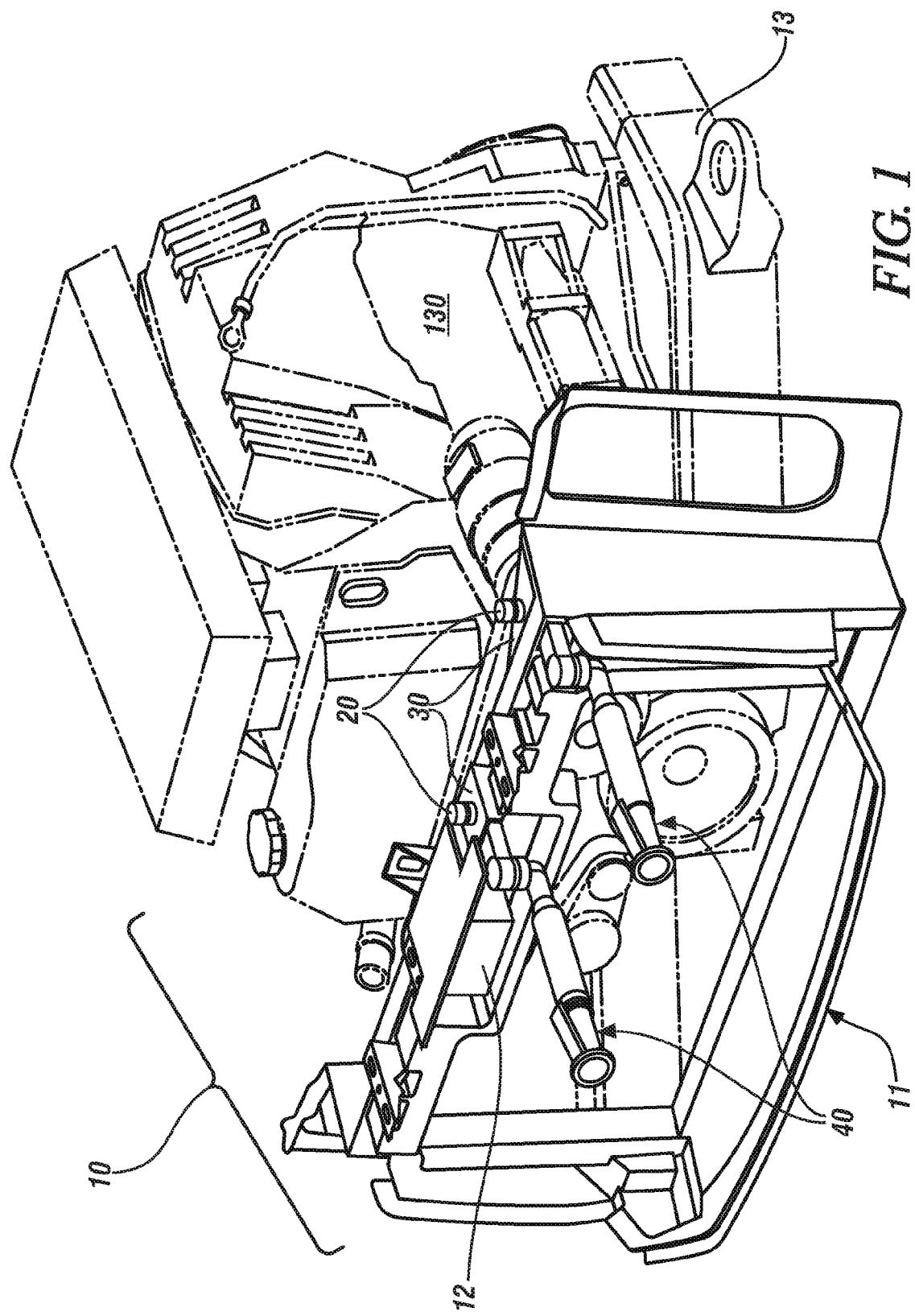
FIG. 1 is a perspective view of a front end of a vehicle in accordance with embodiments.

The following description is merely exemplary in nature and is not intended to limit the present disclosure, its application or uses. It should be understood that throughout the drawings, corresponding reference numerals indicate like or corresponding parts and features.

With reference to FIG. 1, a front end 10 of a vehicle 11 is provided. The front end 10 includes a shutter body 12, a plurality of hood bumpers 20 and a plurality of bracket elements 30. The shutter body 12 is formed to define and establish an outward appearance of a front portion of the vehicle 11 and a chassis 13. The chassis 13 is coupled to or provided as an extension of the shutter body 12 and is formed to define an engine compartment 130 in which an engine or motive element for the vehicle 11 is disposable. A hood (not shown) is attachable to the vehicle to cover the engine compartment 130. The hood is connectable with the vehicle 11 by way of a hinge (not shown) so that the hood can be pivoted about the hinge into an opened condition. In the open condition, the hood can be held in place by a staff so that an operator or user have access the interior of the engine compartment 130.

The hood bumpers 20 are arrayed about a top portion of the shutter body 12 and the engine compartment 130 and are supported in place by the bracket elements 30. In particular, the hood bumpers 20 are disposed such that, when the hood is closed, the underside of the hood impacts the hood bumpers 20. The hood bumpers 20 and the bracket elements 30 absorb this impact in such a way as to prevent or limit damage to the shutter body 12 and the chassis 13 even in an event that the hood is closed with excessive force. In addition, the hood bumpers 20 are disposed such that, when the hood is open, the top portions of the hood bumpers 20 are exposed and visible to the operator or user. As such, in accordance with embodiments, the hood bumpers 20 may be configured to present an attractive appearance.

In order for the hood bumpers 20 to be disposed at the proper location to allow the hood bumpers 20 and the bracket elements 30 to absorb hood impacts, the heights of the hood bumpers 20 are configured to be adjustable relative to the bracket elements 30. This adjustability is provided at bottom portions of the hood bumpers 20, as will be described below, in order to allow the hood bumpers 20 to be configured to present the attractive appearance. Thus, with reference to FIGS. 2-6, it may be seen that each of the bracket elements 30 includes a surface 31, which is formed to define a bore 32, and a helically tapered ramp 33 which is located at or about the bore 32. As shown in FIG. 5, each of the hood bumpers 20 includes a tool engageable first end 21, a non-tool engageable second end 22 and an intermediate section 23. The intermediate section 23 is defined along a longitudinal axis A of the hood bumper 20 between the tool engageable first end 21 and the non-tool engageable second end 22. Reverse-drive helical threading 24 is provided at the intermediate section 23.

Each hood bumper 20 is disposable in the bore 32 of a corresponding one of the bracket elements 30 with the tool engageable first end 21 disposed at an underside of the surface 31 and such that the reverse-drive helical threading 24 engages with the ramp 33 to locate the non-tool engageable second end 22 at a corresponding height at a topside of the surface 31. In this way, the tool engageable first end 21 is disposed to be hidden from view when the hood is opened and can be configured to be engaged with by an appropriate tool without sacrificing an appearance of the overall assembly. Meanwhile, the non-tool engageable second end 22 is visible and configured to present the attractive appearance without sacrificing usability of the overall assembly.

Figure 2:
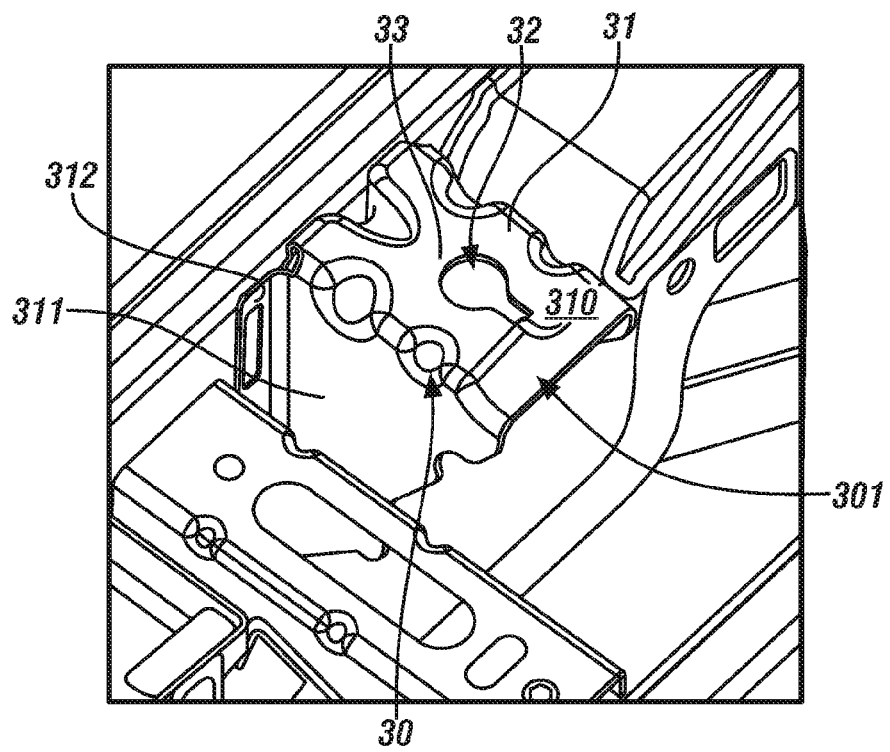
FIG. 2 is a perspective view of a side form bracket element in accordance with embodiments.
Figure 3:
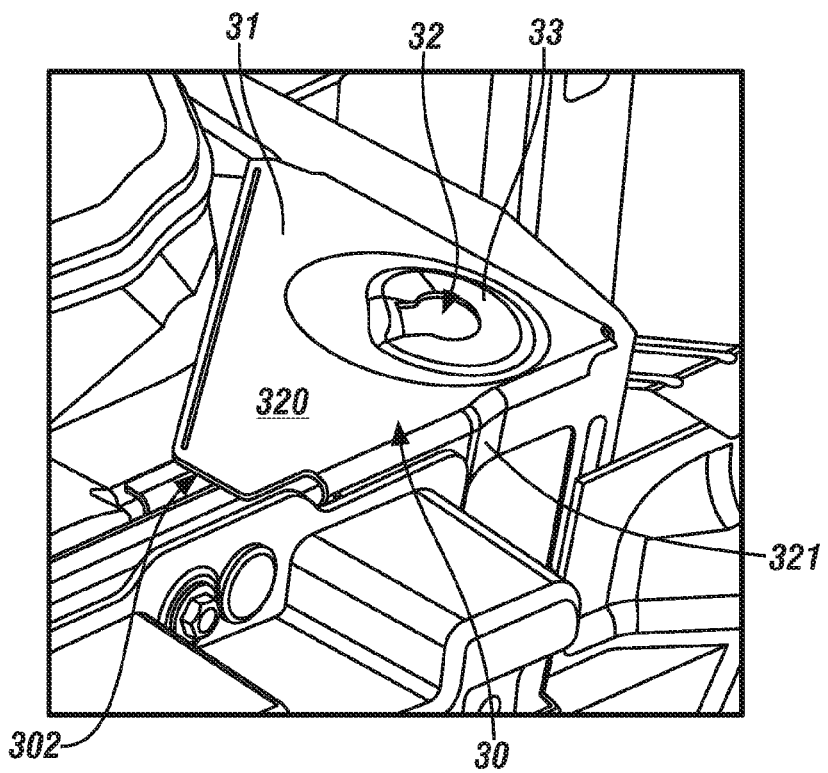
FIG. 3 is a perspective view of a corner form bracket element in accordance with embodiments.
Figure 6:
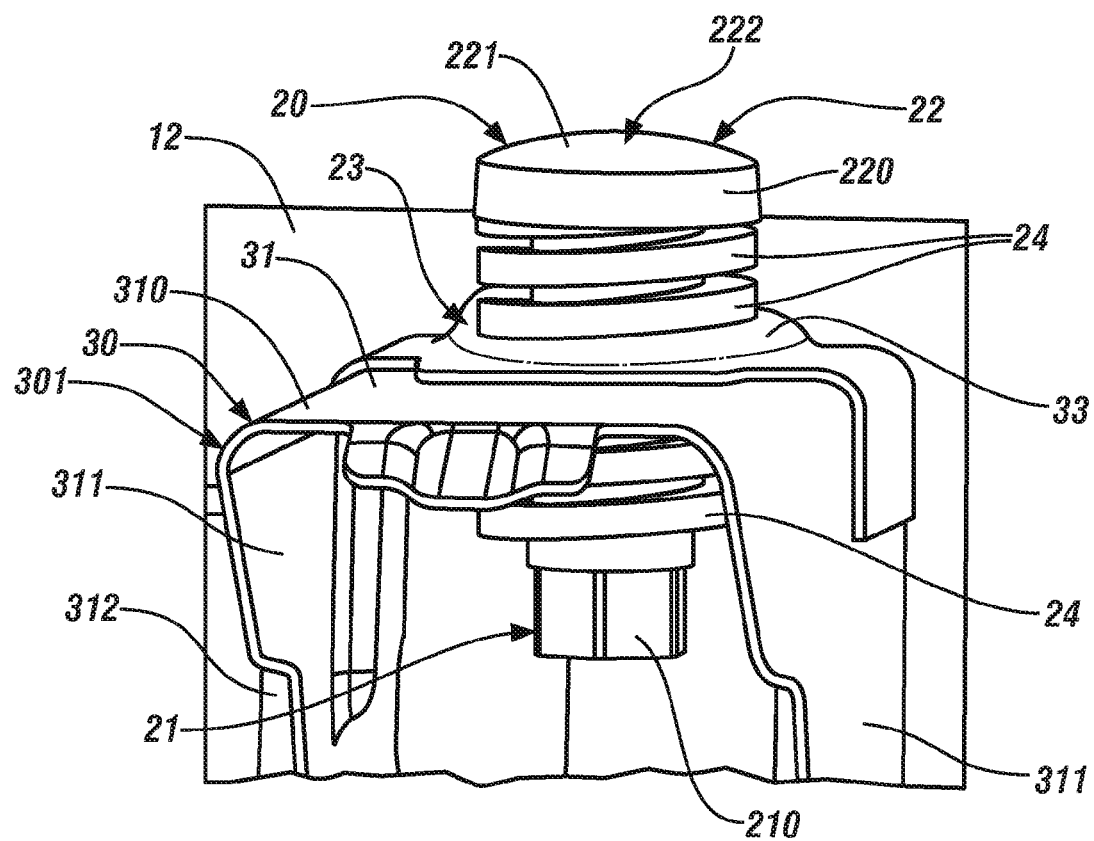
FIG. 6 is a perspective view of a hood bumper installed in a side form bracket element.

The bracket elements 30 can be provided in at least two or more forms including a U-shaped side formation 301 (FIG. 2) and an L-shaped corner formation 302 (FIG. 3). The U-shaped side formation 301 is shown in FIGS. 1, 2 and 6 and is generally disposable in a central portion of the shutter body 12. The U-shaped side formation 301 includes an upper section 310, sidewalls 311 extending substantially in parallel with one another from opposite sides of the upper section 310 and flanges 312 by which the sidewalls 311 can be attached to the shutter body 12. The upper section 310 includes the surface 31 and the ramp 33. The L-shaped corner formation 302 is shown in FIG. 3 and is generally disposable at a side or corner portion of the shutter body 12. The L-shaped corner formation 302 includes an upper section 320, sidewalls 321 that are adjacent to one another and extend from adjacent sides of the upper section 320 and which can be attached to the shutter body 12. The upper section 320 includes the surface 31 and the ramp 33.

Figure 4:
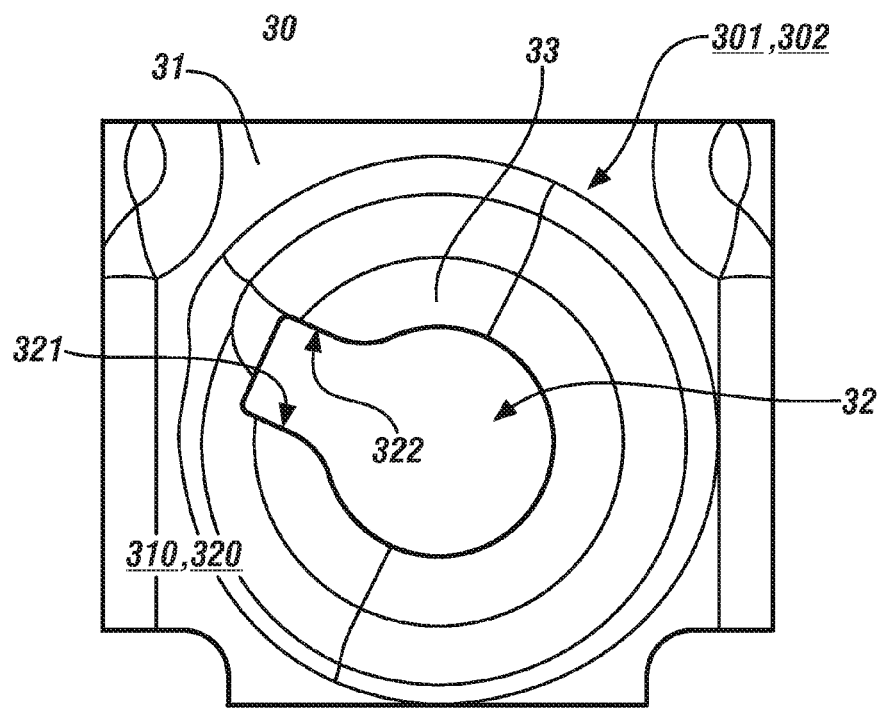
FIG. 4 is a top view of a bracket element of FIG. 2 or FIG. 3.
Figure 5:
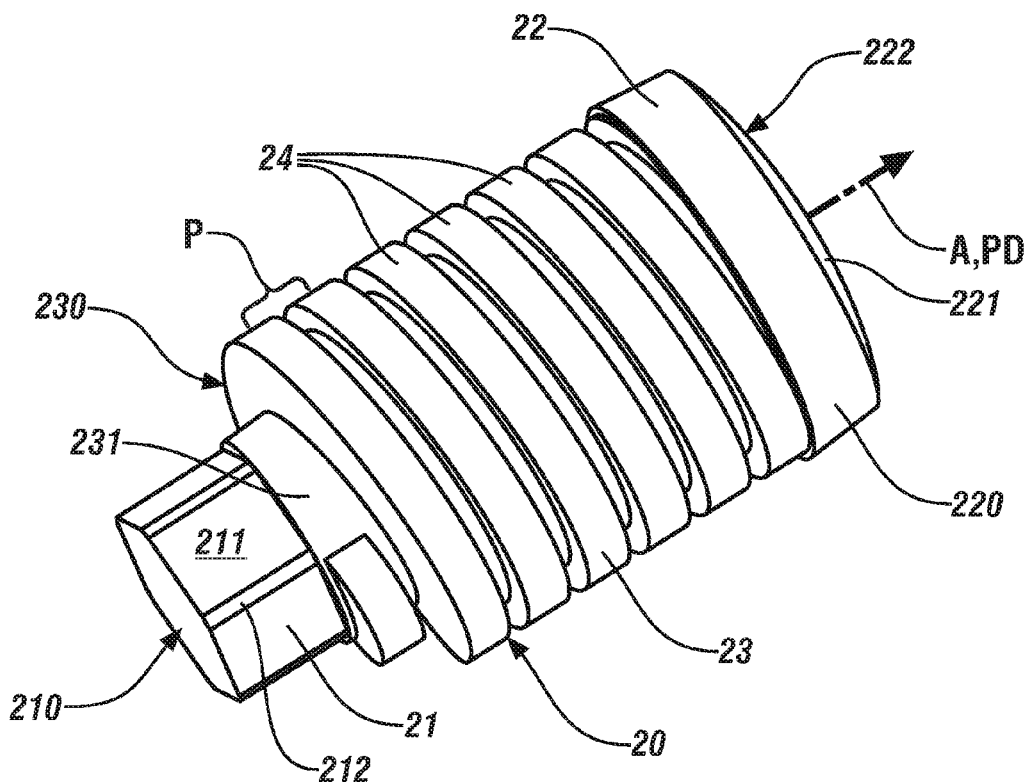
FIG. 5 is a perspective view of a hood bumper in accordance with embodiments.

As shown in FIG. 4, the upper section 310 of the U-shaped side formation 301 and the upper section 320 of the L-shaped corner formation 302 includes the surface 31 and the ramp 33. The surface 31 may be formed of sheet metal and is substantially rectangular in the U-shaped side formation 301 and triangular in the L-shaped corner formation 302. In both cases, the surface 31 defines a plane above which the ramp 33 protrudes. The ramp 33 has a rounded exterior surface that increases in height in a helical pattern relative to the plane of the surface 31. An interior edge of the ramp 33 defines the shape of the bore 32.

In accordance with embodiments, the shape of the bore 32 may be a keyway cutout shape with a central section and a lateral section. The central section is generally elliptical or circular and the lateral section is generally angular with two opposite sides 321 and 322 at different height levels above the surface 31. The difference in heights of the opposite sides 321 and 322 may be substantially similar to a pitch P (see FIG. 5) of the reverse-drive helical threading 24.

As shown in FIGS. 5 and 6, the tool engageable first end 21 of each hood bumper 20 includes a body 210 that is disposed along the longitudinal axis A and a surface 211 that has an angular edge 212, which is oriented along or in parallel with the longitudinal axis A. In accordance with embodiments, the body 210 may have a polygonal volumetric shape, such as a hexagonal volumetric shape. The non-tool engageable second end 22 is opposite the tool engageable first end 21 and includes a skirt portion 220 and a bumper portion 221. The skirt portion 220 may have an elliptical cross-sectional shape or, more particularly, a circular cross-sectional shape. The bumper portion 221 includes a curved leading side 222 that protrudes axially from a longitudinal end of the skirt portion 220 in a protrusion direction PD that is defined along the longitudinal axis A. The intermediate section 23 is axially interposed between the tool engageable first end 21 and the non-tool engageable second end 22. The intermediate section 23 includes a flange element 230 that extends radially outwardly from a central shaft 231 to form the reverse-drive helical threading 24.

Each of the hood bumpers 20 may include or be formed of an injection molded material. The bumper portion 221, in particular, may include a compliant material that is provided for absorbing hood impacts of excessive magnitude.

The skirt portion 220 is substantially and continuously smooth along a circumferential direction and may be tapered toward the non-tool engageable second end 22 such that an edge portion defined by the interface of the skirt portion 220 and the bumper portion 221 is provided as an edge with an obtuse angle. The continuous smoothness of the skirt portion 220 is defined by the absence of any angular portions or edges in the skirt portions, such as the angular edge 212. The tapering of the skirt portion 220 may be carried through on each turn of the reverse-drive helical threading 24 to facilitate the engagement of the reverse-drive helical threading 24 and the ramp 33 without mechanical interference.

Figure 7:
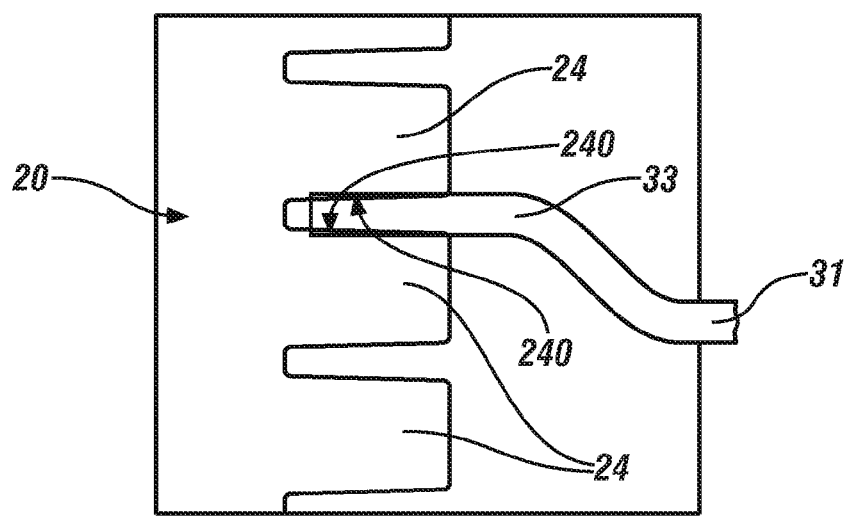
FIG. 7 is a skeletal view of an interface between reverse-drive helical threading of the hood bumper and a ramp of the bracket element.

With reference to FIGS. 6 and 7, each hood bumper 20 may be installed in the corresponding one of the bracket elements 30 such that the tool engageable first end 21 is at an underside of the surface 31 and the non-tool engageable second end 22 is disposed above the surface 31. In this condition, the reverse-drive helical threading 24 of the intermediate section 23 engages with the ramp 33. Since the difference in the heights of the opposite sides 321 and 322 is substantially similar to a pitch of the reverse-drive helical threading 24, rotation of each of the hood bumpers 20 can result in a height-wise translation of the hood bumpers 20. That is, by turning or rotating the hood bumpers 20 in first or second directions, the hood bumpers 20 can be raised or lowered as a result of the engagement of the reverse-drive helical threading 24 and the ramp 33.

In accordance with embodiments and, as shown in FIG. 7, a space between adjacent threads of the reverse-drive helical threading 24 may be slightly smaller than a thickness of the surface 31 at the bore 32 resulting in an interference fit. With this configuration, the rotational position of each of the hood bumpers 20 will tend to be held in place by the frictional contact between the surface 31 and the interior faces 240 of the adjacent threads of the reverse-drive helical threading 24.

Figure 8:
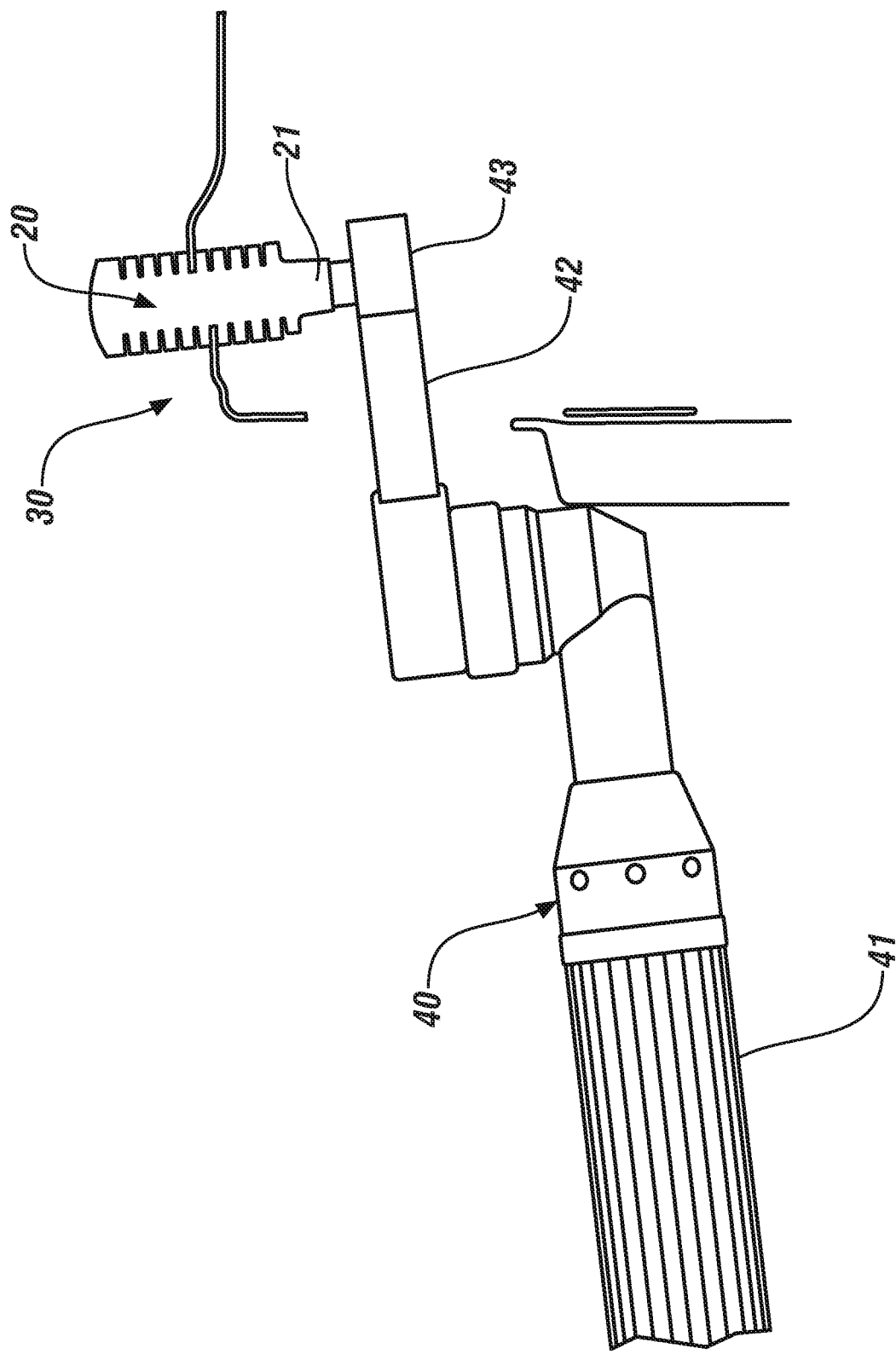
FIG. 8 is a side view of a tool for engagement with the front hood bumper in accordance with embodiments.

With reference to FIGS. 1 and 8, a tool 40 may be provided to facilitate the height-wise positioning of the hood bumpers 20 relative to the bracket elements 30. The tool 40 includes a first elongate element 41, a second elongate element 42 that is coupled to an end of the first elongate element 41 and a head portion 43. The head portion 43 is engageable with the tool engageable first end 21 of the hood bumpers 20. In the particular embodiment where the tool engageable first end 21 is formed as a hexagonal volumetric shape, the head portion 43 may include a hexagonal aperture that fits around the tool engageable first end 21 in a non-slip configuration. In this way, the tool 40 may be used to rotate the hood bumpers 20 about their respective longitudinal axes in order to adjust the heights of the hood bumpers. The tool 40 may be manually operated or powered.

In accordance with further aspects of the invention, a method of assembling a hood portion of a vehicle 11 is provided. The method includes disposing a plurality of bracket elements 30 about a front end 10 of the vehicle 11 with each bracket element 30 including a surface 31 defining a bore 32 and a helically tapered ramp 33 at the bore 32. The method further includes installing a plurality of hood bumpers 20 into each of the plurality of bracket elements 30, respectively, with each hood bumper 20 including a tool engageable first end 21, a non-tool engageable second end 22 and reverse-drive helical threading 24 disposed along a longitudinal axis A defined between the tool engageable first end 21 and the non-tool engageable second end 22. The method further includes engaging the reverse-drive helical threading 24 with the helically tapered ramp 33 at each one of the plurality of bracket elements 30 by rotating each of the hood bumpers 20 to thereby locate the respective non-tool engageable second ends 22 at corresponding heights relative to a topside of the surface 31. More particularly, the respective heights of each of the hood bumpers 20 can be individually adjusted from below the surface 31 of the bracket elements 30.

The respective heights of the hood bumpers 20 can be set to limit a vertical travel of the hood. In this case, the hood bumpers 20 would be set relatively high whereby they would contact the hood at a relatively high point in a hood closure event. By contrast, the hood bumpers 20 can be set at relatively low heights to permit a greater travel distance of the hood and to provide additional support and impact absorption at the interface of the hood bumpers 20 and the bracket elements 30.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A hood bumper, comprising:
a first end including a body defining a longitudinal axis and a surface having an angular edge oriented along the longitudinal axis;
a second end opposite the first end and including a skirt portion and a bumper portion protruding from a longitudinal end of the skirt portion in a protrusion direction defined along the longitudinal axis; and
an intermediate section interposed between the first and second ends, the intermediate section including reverse-drive helical threading and having a diameter greater than a diameter of the first end but less than a diameter of the second end, wherein the skirt portion:
flares outwardly from a narrowest flaring portion at an interface of the skirt and bumper portions to define the diameter of the second end at a widest flaring portion, which is an endpoint of the reverse-drive helical threading,
is continuously smooth along a circumferential direction, and
is tapered such that the interface is provided as an edge with an obtuse angle.

2. The hood bumper according to claim 1, wherein the body has a polygonal volumetric shape.

3. The hood bumper according to claim 1, wherein the skirt portion has an elliptical shape.

4. The hood bumper according to claim 1, wherein the bumper portion comprises a curved leading side.

5. The hood bumper according to claim 1, wherein the first end, the second end and the intermediate section comprise an injection molded material and the bumper portion comprises a compliant material.

6. A hood bumper assembly, comprising:
a bracket element including a surface defining a bore and a helically tapered ramp at the bore; and
a hood bumper comprising a tool engageable first end, a second end non-engageable by the same tool and reverse-drive helical threading disposed along a longitudinal axis between the tool engageable first end and the non-tool engageable second end,
a diameter of the reverse-drive helical threading being greater than a diameter of the tool engageable first end but less than a diameter of the second end, and
the hood bumper being disposable in the bore with the tool engageable first end at an underside of the surface such that the threading engages with the ramp to locate the second end at a corresponding height at a topside of the surface,
wherein the second end comprises a skirt portion and a bumper portion protruding from a longitudinal end of the skirt portion in a protrusion direction defined along the longitudinal axis and:
flares outwardly from a narrowest flaring portion at an interface of the skirt and bumper portions to define the diameter of the second end at a widest flaring portion, which is an endpoint of the reverse-drive helical threading,
is continuously smooth along a circumferential direction, and
is tapered such that the interface is provided as an edge with an obtuse angle.

7. The hood bumper assembly according to claim 6, wherein the bracket element and the hood bumper are each provided as a plurality of bracket elements and hood bumpers with corresponding numbers of each.

8. The hood bumper assembly according to claim 6, wherein the bracket element comprises one of a U-shaped bracket and an L-shaped bracket.

9. The hood bumper assembly according to claim 6, wherein the bracket element comprises an upper surface defining the bore and the helically tapered ramp.

10. The hood bumper assembly according to claim 6, wherein the bore has a keyway cutout shape.

11. The hood bumper assembly according to claim 6, further comprising a tool, which is engageable with the tool engageable first end to rotate the hood bumper about the longitudinal axis to vary the corresponding height.

12. The hood bumper assembly according to claim 6, wherein:
the tool engageable first end comprises a body and a surface having an angular edge, and
an intermediate section is interposed between the tool engageable first end and the second end and comprises the reverse-drive helical threading.

13. The hood bumper assembly according to claim 12, wherein the body has a polygonal volumetric shape.

14. The hood bumper assembly according to claim 12, wherein the skirt portion has an elliptical shape.

15. The hood bumper assembly according to claim 12, wherein the bumper portion comprises a curved leading side.

16. The hood bumper assembly according to claim 12, wherein the hood bumper comprises an injection molded material and the bumper portion comprises a compliant material.

17. A method of assembling a hood portion of a vehicle, the method comprising:
disposing a plurality of bracket elements about a front region of a vehicle, each bracket element comprising a surface defining a bore and a helically tapered ramp at the bore;
installing a hood bumper into each of the plurality of bracket elements, each hood bumper comprising a tool engageable first end, a second end non engageable by the same tool and reverse-drive helical threading disposed along a longitudinal axis defined between the tool engageable first end and the second end, a diameter of the reverse-drive helical threading being greater than a diameter of the tool engageable first end but less than a diameter of the second end; and
engaging the reverse-drive helical threading with the ramp at each one of the plurality of bracket elements by rotating each of the hood bumpers to thereby locate the respective second ends at corresponding heights relative to a topside of the surface,
wherein the second end of each hood bumper comprises a skirt portion and a bumper portion protruding from a longitudinal end of the skirt portion in a protrusion direction defined along the longitudinal axis and:
flares outwardly from a narrowest flaring portion at an interface of the skirt and bumper portions to define the diameter of the second end at a widest flaring portion, which is an endpoint of the reverse-drive helical threading,
is continuously smooth along a circumferential direction, and
is tapered such that the interface is provided as an edge with an obtuse angle.

* * * * *